Figure 1:
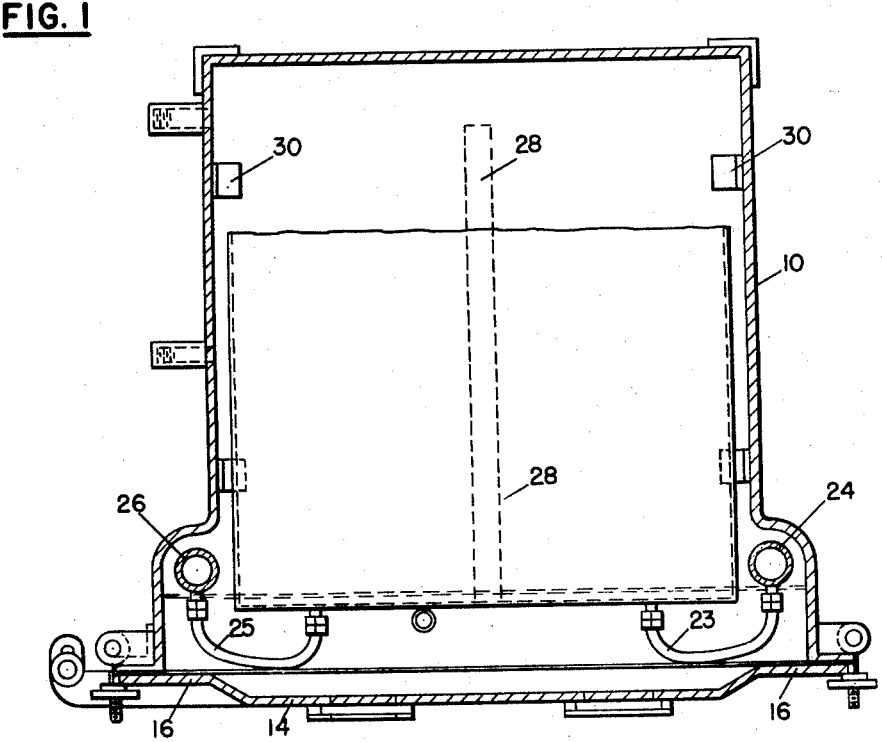

May 30, 1950  E. W. FLOSDORF  2,509,681
PROCESS OF DESICCATING FRUIT JUICES
Filed Jan. 10, 1946

INVENTOR
EARL W. FLOSDORF
BY
ATTORNEYS

Patented May 30, 1950

2,509,681

UNITED STATES PATENT OFFICE 2,509,681

PROCESS OF DESICCATING FRUIT JUICES

Earl W. Flosdorf, Forest Grove, Pa., assignor, by mesne assignments, to Tabor-Olney Corporation, a corporation of Maryland Application January 10, 1946, Serial No. 640,364

2 Claims. (Cl. 99—206)

This invention relates to improvements in the production of desiccated fruit juices and aqueous alimentary extracts, such as coffee extract, in particular, citrus fruit juices, which desiccated products are stable for relatively long periods of time if stored in sealed containers at appropriately low moisture contents, and which on the addition of water, reconstitute to a product which is the substantially full equivalent of fresh material.

The desiccation of a number of products, including biologicals, foodstuffs and fruit juices and the like, by the procedure known as "freeze-drying" has been described in a number of patents and publications, and is used on a substantial scale for the preservation of biologicals. In general, the procedure involves freezing the aqueous material, either by exposure to a refrigerant or by self-freezing under vacuum, in which procedure the cooling incident to rapid evaporation under a vacuum accomplishes the freezing, and subjecting the frozen material to a high vacuum usually of the order of 50–500 microns, whereby the water in the frozen material becomes converted to vapor and the material is dried. To hasten the rate of drying, it is customary to supply heat to the frozen material during the drying operation to supply the latent heat of sublimation of the water which is removed, as by jacketing the vacuum chamber in which the material is kept during the drying and circulating warm or hot water through the spaces in the jacket, and particularly in larger pieces of equipment, placing the material in containers or trays on shelves provided with spaces for circulation of the heating medium. Radiant heaters, such as lamps, electrical resistances, and the like, have also been used to supply the heat. Desiccation of citrus fruit and other juices, coffee extracts and the like, by this procedure gives desiccated products having excellent properties. With citrus fruit juices, addition of a small quantity of sugar as described in Patent 2,380,036 and/or a small quantity of a protective colloid such as gelatin or the like improves the product. Sealing the product in containers at the necessary low moisture content is greatly facilitated if at the end of the drying operation, the temperature of the dried material is raised above room temperature to minimize absorption of water from the atmosphere in operations incident to sealing the material in containers as described in application Serial No. 490,329, filed June 10, 1943, now Patent No. 2,396,561.

The present invention provides improvements in the desiccation of such materials as citrus fruit and other juices, and alimentary extracts, such as coffee extracts, particularly orange juice, which substantially reduces the cost of desiccation by the freeze-drying procedure, cost being, as will be understood, a major factor in dealing with such products.

In accordance with the present invention, the fruit juice or extract, particularly orange juice, is preconcentrated from the liquid state by appropriate means before freezing and the concentrate is then frozen and subjected to high vacuum desiccation at an appropriate low temperature. The preconcentration may be carried out in any suitable way, as for example, vacuum evaporation at relatively low temperature, for example 10° C., or by subjecting the material to partial freezing with formation of a mixture of ice and concentrate and separating the concentrate from the ice, as by centrifuging. Such preconcentration should be carried out to an extent such that the concentrate has a volume of from about one-seventh to one-half the original volume, corresponding to a removal of something over one-half the water present in the fresh product, and care should be taken that the preconcentration is carried out in such a way as not to deleteriously affect the flavor of the juice. Such methods of concentration from the liquid state are known and need not be further described.

The preconcentrated product, in accordance with the invention, is then frozen, and after freezing is subjected to a high vacuum whereby the water present is converted to vapor and the product is dried. The vacuum used is a high vacuum, usually from 50 to 2500 microns, although, particularly at the end of the operation, it may be higher. During the initial stages of this operation and until nearly all of the water present has been removed, the temperature of the product is kept well below 0° C., usually below −10° C., for example, at −20° to −30° C. The temperature of the material is controlled by the temperature of the medium circulated through the spaces in the jacket and shelf of the vacuum chamber, in the event that apparatus of that type is used, or by thermostatic or other control of electrical heaters, etc. The material, during the drying operation, is permitted to soften and become plastic in nature, instead of maintaining it in a brittle condition, and in the course of the drying, as the result of this softening which takes place, the material puffs in the trays or pans or other containers in which it is confined, with the result that the area available for evaporation becomes greater than is the case with materials which remain brittle, and the rate of drying is radically promoted. The heat input must be regulated to avoid too great softening or liquefaction of the material, which would result in uncontrollable foaming, which can be so pronounced as to cause the material to spill out of the trays or other containers, or to block off the spaces within the vacuum chamber relied upon for the flow of the generated water vapor, and greatly impede the desiccation operation.

Toward the end of the drying operation, when most of the water has been removed, the temperature of the material is increased so that the material eventually reaches a temperature substantially in excess of normal room temperature, for example, as high as 60–65° C., to insure the reduction of the moisture content of the product to the lowest practicable level, advantageously about 0.2% or less. The material is then transferred to cans or the like in which it is sealed for storage and distribution. This transfer is advantageously carried out while the material is still at a temperature in excess of normal room temperature, to avoid or minimize absorption of water from the atmosphere during the transferring operation, as described in said application Serial No. 490,329.

The preconcentrated products, treated in accordance with the present invention, behave in a manner quite different from that of unconcentrated products subjected to desiccation by the freeze-drying procedure. Thus, under substantially the same conditions of temperature, an unconcentrated orange juice may be dried from the frozen state while remaining brittle throughout the entire operation, without puffing, while the preconcentrated product will soften and puff. In the practice of the present invention, the temperature of the material must be carefully controlled to avoid undue frothing, which interferes with the operation. The reason why a preconcentrated product and an unconcentrated product, during the desiccation operation and with the same water content and at the same temperature, behave in such different manners is not known, but in the practice of the present invention advantage is taken of this phenomenon to facilitate the desiccation and to permit the use of such methods as vacuum evaporation or fractional freezing to remove a substantial proportion of the water present in the juice, and to substantially lessen the cost of the desiccation operation.

The invention will be further described in connection with the appended drawing which illustrates one form of apparatus which may be used with advantage in practicing the invention.

Figure 2:
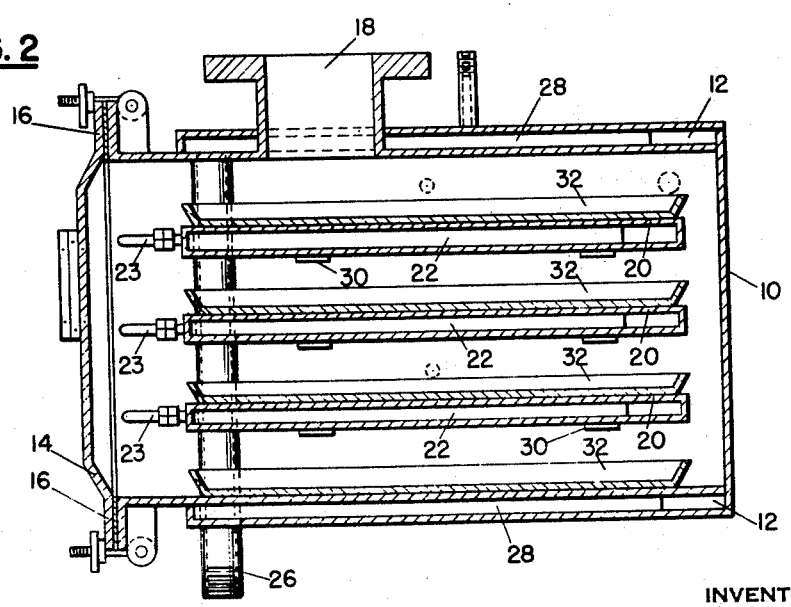

In the drawing, Fig. 1 is a sectional plan view of a suitable drying chamber and Fig. 2 is a sectional view of the side elevation thereof.

The apparatus illustrated consists of a chamber 10 jacketed at the top and bottom as illustrated at 12 and with a door 14 at the front provided with a suitable gasket 16 adaped to be closed to form a vacuum-tight seal. At the top is provided a flanged outlet 18 for connection to the means for producing a vacuum within the chamber and for the flow of generated water vapor from the chamber. In the chamber illustrated there are provided three hollow shelves 20 with interior spaces 22, the spaces 22 and 12 being connected by line 23 with the supply line 24 and by lines 25 to the drainage line 26, baffle 28 being provided within each of these spaces so that whatever medium is circulated therethrough will be evenly distributed and supply heat to or withdraw heat from metal surfaces reasonably uniformly. The shelves are supported on the brackets 30. In the apparatus illustrated, which is intended for the desiccation of materials in bulk, trays 32 are provided which rest upon the bottom of the chamber and upon each of the shelves. Instead of using separate trays as shown, the shelves themselves and the bottom of the chamber may be in the form of trays, being provided with suitable flanges. Because of the improved heat transfer to the material, it is frequently advantageous to use this form of construction instead of providing the separate trays as illustrated.

The sides of the trays advantageously slope at an angle of about 45–60° to assist in confining the product within the trays during the operation.

In carrying out the procedure in apparatus of the type illustrated to produce a desiccated orange juice, the preconcentrated product, having a volume of from about one-seventh to one-half its initial volume, is placed in the trays 32 and frozen. The freezing can be accomplished by circulating a cold medium through the spaces provided in the shelves and the jacket of the chamber, or by placing the trays in a suitable refrigerating zone and introducing them into the chamber after the product is frozen, or by self-freezing by producing a relatively low vacuum, say a vacuum of 2–4½ mm., within the chamber and permitting evaporation to take place with concomitant cooling of the material and freezing of it either with or without circulating a cold medium through shelves and jacket. The amount of material placed in each tray should be such that each tray is but about one-quarter to one-third full, so that it may puff up to a substantial extent during the desiccation operation without spilling. Layers of material 1 to 2 inches thick process very well. When the material is frozen, a high vacuum is applied to the chamber in accordance with the usual procedure. Ordinarily a vacuum of about 500 microns is used at the start, and the desiccation proceeds. A heating medium, for example, warm or hot water at temperatures of 70–150° F., or even at a higher temperature, is circulated through the spaces within the shelves and the jackets of the chamber to supply the heat necessary for the sublimation to proceed. The temperature of the heating medium is controlled so that the concentrated, frozen product softens and puffs up somewhat, for example, to a volume of three or four times its initial volume or even somewhat more, but not to an extent sufficient to spill over the sides of the trays or rise to the point where it comes into such close contact with the surface of the shelf above that the escape of the generated water vapor is blocked and the drying operation retarded. In some cases where the product puffs up unduly, a mechanical contrivance may be used to break up the mass, permitting the escape of the vapor which causes the puffing or frothing, and reducing the volume of the mass. It should be understood that while the material is softened and is not brittle, it is not in any sense liquid, but on the contrary, can well be described as a plastic material.

By providing the trays 32 with sloping sides as illustrated, control of the puffing is facilitated. This follows from the fact that the product directly on the bottom of the tray is somewhat warmer than that which is resting on the sloping side walls, there being a temperature gradient from he bottom of the tray up the side walls. This difference is sufficient to keep the material adjacent the walls harder than the material resting on the bottom of the tray so that there is less frothing or puffing at the upper and outer edges, which assists in confining the product within the trays and preventing it from frothing over the sides.

Because of variations in the properties of pre-concentrated juices, for example, orange juices, it is impossible to specify exact temperatures of the material during the processing operation, and the heat supply must be adjusted during the operation to permit the desired degree of puffing or frothing, that is, to permit the product to expand to a volume several times its initial volume without flowing out of the trays or sealing the spaces through which the vapors must pass. Thus juice from Florida oranges as a general rule requires lower temperatures than the juice from California oranges. The juice from Florida Valencia oranges in general requires lower temperatures than the juice from Seedlings and juice from late season oranges in general lower temperatures than the juice from early season oranges. I know of no explanation for these observed differences in behavior, except sugar content.

As a typical illustration, however, of an operation carried out in apparatus such as that illustrated, an orange juice concentrate, produced by freezing ice crystals from a fresh Florida orange juice to a concentration of about 3½:1, was placed in trays, as illustrated, to a depth of about 25 mm. The material was then frozen by circulating a cold refrigerant through the jacket and spaces in the shelves of the apparatus, the temperature of the material being reduced in this way to about −30° C. A high vacuum was then applied to the chamber, and a heating medium circulated through the jacket and the spaces in the shelves. In the following table is shown a log of the run giving the temperature of the concentrate of the circulating heating medium and the pressure within the chamber.

*Table*

| Time | Pressure | Concentrate Temp. | Heating medium temperature | |
|---|---|---|---|---|
| | | | In | Out |
| | Microns | °C. | °F. | °F. |
| 11:30 | (1) | −28 | | +15 |
| 11:35 | 2,600 | −17 | | +15 |
| 12:00 | 100 | −22 | | +10 |
| 12:10 | | −22 | | |
| 12:35 | 150 | −22 | +80 | +74 |
| 1:30 | 150 | −20 | +118 | +114 |
| 2:00 | 150 | −18 | +120 | +120 |
| 2:30 | 150 | −12 | +120 | +120 |
| 3:30 | 150 | +4 | +120 | +120 |
| 4:20 | 150 | +14 | +120 | +120 |
| 5:30 | 60 | +5 | +110 | +120 |
| 8:30 | 40 | +42 | +120 | |
| 10:30 | 40 | +42 | +120 | |
| 12:20 | 10 | +42 | +100 | |
| 2:30 | 10 | +40 | +106 | |
| 4:30 | 10 | +40 | +100 | |
| 6:00 | 10 | +40 | +100 | |
| 7:00 | 10 | +40 | +100 | |
| 8:10 | 10 | +39 | +100 | |

1 Start vacuum.

In this operation, the concentrated product in the trays started to puff up at about 12:10 and at 2 o'clock the layer had risen about three inches, greatly extending the surface available for vaporization of the water. After 2:30, when nearly all of the water had been removed from the material, its temperature started to rise above sub-zero temperatures, and the removal of the last small quantities of water was accomplished at elevated temperatures of about 40° C. At the end of the operation, the desiccated material was removed from the chamber and packed in dried cans. The resulting desiccated product, on storage at ordinary temperatures retained the property of ready solubility in water, and when restored by the addition of water, was substantially the full equivalent of the fresh juice.

In transferring the desiccated material to cans or the like for storage and distribution, it is advantageous to carry out the transfer while maintaining the temperature of the material in excess of room temperature to minimize the absorption of moisture from the atmosphere, particularly where the relative humidity is either approximately normal or where the transfer is not carried out in a specially dried atmosphere. Also to reduce the moisture content of the product to the required low level, e. g., .3% or less, it is advantageous to raise the temperature of the material at the end of the desiccation operation and while the high vacuum is still applied to it to a temperature substantially in excess of normal room temperature, for example, from 40–60° C. If the product is of the type which at this temperature is brittle as distinguished from plastic it may be broken up into granules and sealed in cans at that temperature. With some products, for example, those derived from late season Florida oranges, the desiccated product may be somewhat plastic at temperatures as low as 110° F., even with moisture contents as low as .3% or less. With such products, it is advantageous to cool the desiccated material to a temperature at which it is brittle before transferring it to the final containers, else the product in the containers will tend to form a hard lump, which while satisfactory from the standpoint of keeping properties and flavor of the restored material, dissolves in water with difficulty and hence is unsatisfactory. By reducing the temperature of the desiccated material to the level at which the product is brittle, advantageously between normal room temperature of around 70° F. and the temperature at which the processing of the material is finished, usually from about 100 to about 140° F., the product can be placed in the containers in the form of granules which do not tend to cohere into a solid mass, and which readily dissolve in water. The exact temperature to which the material should be cooled, if cooling appears desirable, varies with juice from different sources, and may range from around 85–90° F. to as much as 120 or 130° F.

The operation described in connection with the illustrated apparatus is a batch operation, in which the material is frozen in trays within a vacuum chamber and heated by a medium circulated through the jackets and the spaces in the shelves. It will be noted that the material in any tray is heated, not only by conduction through the bottom of the tray, but also by radiation from the shelf above or from the upper part of the vacuum chamber. This supply of heat to the upper surface of the frozen material as well as to the lower surface is a marked advantage in promoting the rate of vaporization of the water, because the latent heat is supplied to the maximum area, without at any time supplying heat to any portion of the material undergoing desiccation in such a way as to cause local overheating.

Instead of using a circulating heating medium operating in spaces or jackets, heating may be accomplished by radiant heat, as by the use of infra-red, e. g. lamps or resistance heaters, or other types of radiant heaters, within the vacuum chamber. Also, the invention may be practiced with the use of continuous procedure, instead of the batch procedure previously described in detail. Thus, the preconcentrated material may be introduced, through a suitable vacuum lock or by spraying, onto a heated moving conveyor within a vacuum chamber, advantageously with a second heated belt above the resulting moving layer of frozen material or with the use of infra-red heaters such as lamps or radiant heaters of other types above the moving layer, and with the belt itself heated from below either by a heating medium or by radiant heat to provide the maximum heat input to the material without local overheating, and with control of the heat input to provide softening and puffing of the product without liquefaction thereof or frothing to such an extent as to interfere with normal operation. Thus, expansion of the volume of the material to 3 to 4, or somewhat more, times its original volume permits the practice of the present invention under optimum conditions. With such apparatus, the material may be sprayed onto the conveyor, freezing being accomplished by the cooling incident to evaporation in the vacuum chamber, or the material may be prefrozen, granulated and introduced through a vacuum lock in the form of granules or chips, or the material may be flowed onto the conveyor and frozen there, advantageously by the cooling incident to the vacuum evaporation. The dried material leaving the end of the conveyor, where it may be removed by a suitable mechanical scraper, may be removed from the vacuum apparatus through a suitable vacuum lock of the usual type.

The invention has been described with particular reference to the desiccation of orange juice, but it is applicable to the desiccation of other fruit juices and similar products, such as other citrus fruit juices, pineapple juice, apple juice, and alimentary extracts, such as coffee extracts, and the like. Nearly all of these products, in general, exhibit, when dried by the freeze-drying procedure after preconcentration, a behavior similar to that exhibited by orange juice and described in detail above. With coffee extracts, preconcentration to a solids content of about 50% gives optimum results in the practice of the invention, from the standpoint of quality of product and cost.

I claim:

1. The process of desiccating fruit juices and aqueous alimentary extracts which comprises concentrating the fresh liquid, then freezing the concentrated product, and removing water from the frozen product by the use of a high vacuum and a heating medium, the temperature of the heating medium being so regulated during the desiccation from the frozen state as to maintain the frozen material in a plastic condition and cause the frozen material to puff to a volume substantially greater than its initial volume.

2. The process as in claim 1 in which the fresh liquid, before freezing is concentrated within the range from about one-half to about one-seventh its original volume.

EARL W. FLOSDORF.

REFERENCES CITED

The following references are of record in the file of this patent:

UNITED STATES PATENTS

| Number | Name | Date |
| --- | --- | --- |
| 1,211,361 | Sheehan | Jan. 2, 1917 |
| 1,556,572 | Pierce | Oct. 6, 1925 |
| 2,248,634 | Krause | July 8, 1941 |
| 2,383,070 | Mook | Aug. 21, 1945 |
| 2,388,917 | Hormel | Nov. 13, 1945 |